US011917361B2

(12) United States Patent
Levy

(10) Patent No.: US 11,917,361 B2
(45) Date of Patent: Feb. 27, 2024

(54) LOUDSPEAKER

(71) Applicant: Michael Levy, Huntington, NY (US)

(72) Inventor: Michael Levy, Huntington, NY (US)

( * ) Notice: Subject to any disclaimer, the term of this patent is extended or adjusted under 35 U.S.C. 154(b) by 0 days.

(21) Appl. No.: 17/400,528

(22) Filed: Aug. 12, 2021

(65) Prior Publication Data

US 2022/0053261 A1 Feb. 17, 2022

Related U.S. Application Data

(60) Provisional application No. 63/064,754, filed on Aug. 12, 2020.

(51) Int. Cl.

| | |
|---|---|
| ***H03G 5/00*** | (2006.01) |
| ***H04R 1/28*** | (2006.01) |
| ***H04R 3/04*** | (2006.01) |
| *H04R 3/00* | (2006.01) |

(52) U.S. Cl.

CPC ............. *H04R 1/2803* (2013.01); *H04R 3/04* (2013.01)

(58) Field of Classification Search

CPC ................................ H04R 1/2803; H04R 3/04
USPC .................................... 381/98, 337, 338, 96
See application file for complete search history.

(56) References Cited

U.S. PATENT DOCUMENTS

| | | | | |
|---|---|---|---|---|
| 11,095,983 B1 * | 8/2021 | Coombs | H04R 1/02 |
| 2011/0037906 A1 * | 2/2011 | Gawronski | H04N 5/60 348/E5.122 |
| 2012/0033843 A1 * | 2/2012 | Ouweltjes | H04R 9/022 381/345 |
| 2012/0328141 A1 * | 12/2012 | Parker | H04R 9/022 381/345 |
| 2016/0360312 A1 * | 12/2016 | Wheeler | H04R 1/2853 |
| 2018/0027321 A1 * | 1/2018 | Jaguste | H04R 1/2803 381/59 |
| 2020/0029150 A1 * | 1/2020 | Croft, III | H04R 1/2857 |

* cited by examiner

*Primary Examiner* — Ammar T Hamid
(74) *Attorney, Agent, or Firm* — Scarinci Hollenbeck, LLC; Libby Babu Varghese

(57) ABSTRACT

A method and system of improving frequency responses at lower frequencies from a loudspeaker includes simultaneously tuning a transmission line and a tuned port in the same system. The transmission line and the tuned ports are tuned to innate characteristics of the physical and electrical components within the loudspeaker. In one embodiment, an improved frequency response of a loudspeaker is achieved by tuning the transmission line to the frequency of the maximum excursion point of the loudspeakers. In another embodiment the transmission line is tuned to the resonance frequency of the loudspeaker having the tuned port.

16 Claims, 9 Drawing Sheets

LOUDSPEAKER

PRIORITY CLAIM

This application is based upon and claims the benefit of priority from U.S. Prov. Appln. Ser. No. 63/064,754, filed on Aug. 12, 2020, the entire contents of which are incorporated herein by reference.

FIELD OF THE INVENTION

The present disclosure is directed to loudspeakers. Specifically, the present invention is directed to systems for bass extension and increased power handling in ported loudspeakers.

BACKGROUND OF THE INVENTION

Ported loudspeaker designs have been defined using the Small-Theile parameters since the early 1970s. These ported loudspeakers are easy to make and produce more efficient high Q bass response. There are several programs available that predict response fairly accurately.

Tuned ports are not free of problems. One problem with tuned ports is that they decouple to the air below system resonance. Below that point the woofer moves without creating sound. Because of this, the power handling below resonance decreases with decreasing frequency and the woofer moves with negligible sonic output.

Transmission lines have been used in the past to extend the response of a speaker below resonance, but they remain uncontrolled above resonance. A solution is needed to the decoupling problem in ported speakers. What is desired is a way to have the system cross over from operating as a port to operating as a transmission line at system resonance. What is desired is a transmission line with an integral tuned port to address this problem. What is also desired is a way to increase system power handling.

SUMMARY OF THE INVENTION

The present invention provides method and system of improving frequency responses at lower frequencies in a ported loudspeaker. The invention simultaneously tunes a loudspeaker's transmission line and tuned port. The transmission line is tuned to the frequency of the tuned port. In one embodiment, the transmission line is tuned to a maximum excursion point of the loudspeakers. In another embodiment, the transmission line is tuned to a resonance frequency of the tuned port system.

A loudspeaker having improved frequency responses at lower frequencies has a tuned port and a transmission line, each are tuned to a frequency. The transmission line and the tuned port are simultaneously tuned. The frequency of the transmission line is tuned to the frequency of the tuned port. The transmission line may be tuned to a maximum excursion point of the loudspeakers. The transmission line may be tuned to a resonance frequency of the loudspeakers with a tuned port.

A loudspeaker comprising a transmission line and a port. The port is tuned. The transmission line is one quarter of a wavelength of system maximum excursion. The cross-sectional area of the port is approximately ⅓ the area of a cone. The cross-sectional area of the transmission line is at least the area of a cone.

DETAILED DESCRIPTION OF THE INVENTION

Figure 1:
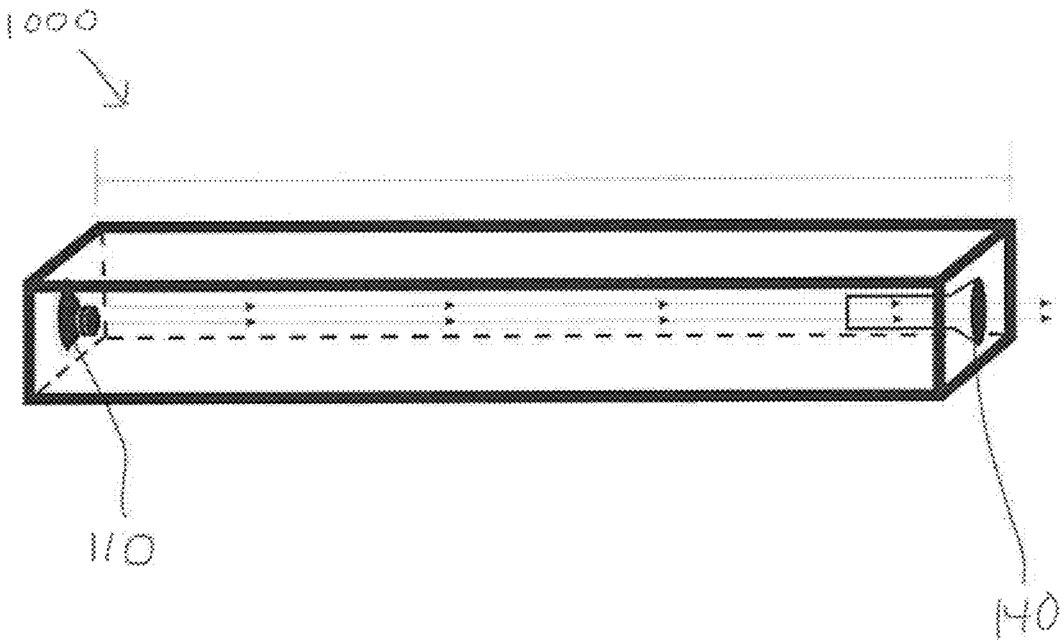
FIG. 1 shows the length of a transmission line being ¼ the maximum excursion wavelength of the woofer in the tuned port system.

FIG. 1 shows a loudspeaker 1000 with a speaker 110 to a port 140. Here the transmission line is straight and terminate in the port 140. The loudspeaker 1000 has a length of a transmission line that is ¼ the wavelength of maximum excursion. The transmission line is a tuned length of pipe. Incorporating a transmission line inside the loudspeaker is one approach to addressing the problem of decoupling. Loudspeaker 1000 shows the direction of air or sound travel from a speaker 110 to a port 140. The port 140 may be a tuned port.

The transmission line operates in a similar method as a stopped pipe in a pipe organ. The pipe has a frequency or frequency band that resonates because the Q in the pipe (ratio of reactance to resistance) is high at those frequencies. As is known to one of skill in the art of tuning cabinets to be speakers or a pipe organ, it is recognized that is that a ¼ wavelength long pipe will tune to a frequency. The frequency can be activated by running air over it, or having a woofer resonate at that or similar frequency. That frequency will be augmented because it is a resonance just like a pipe organ works.

Figure 2:
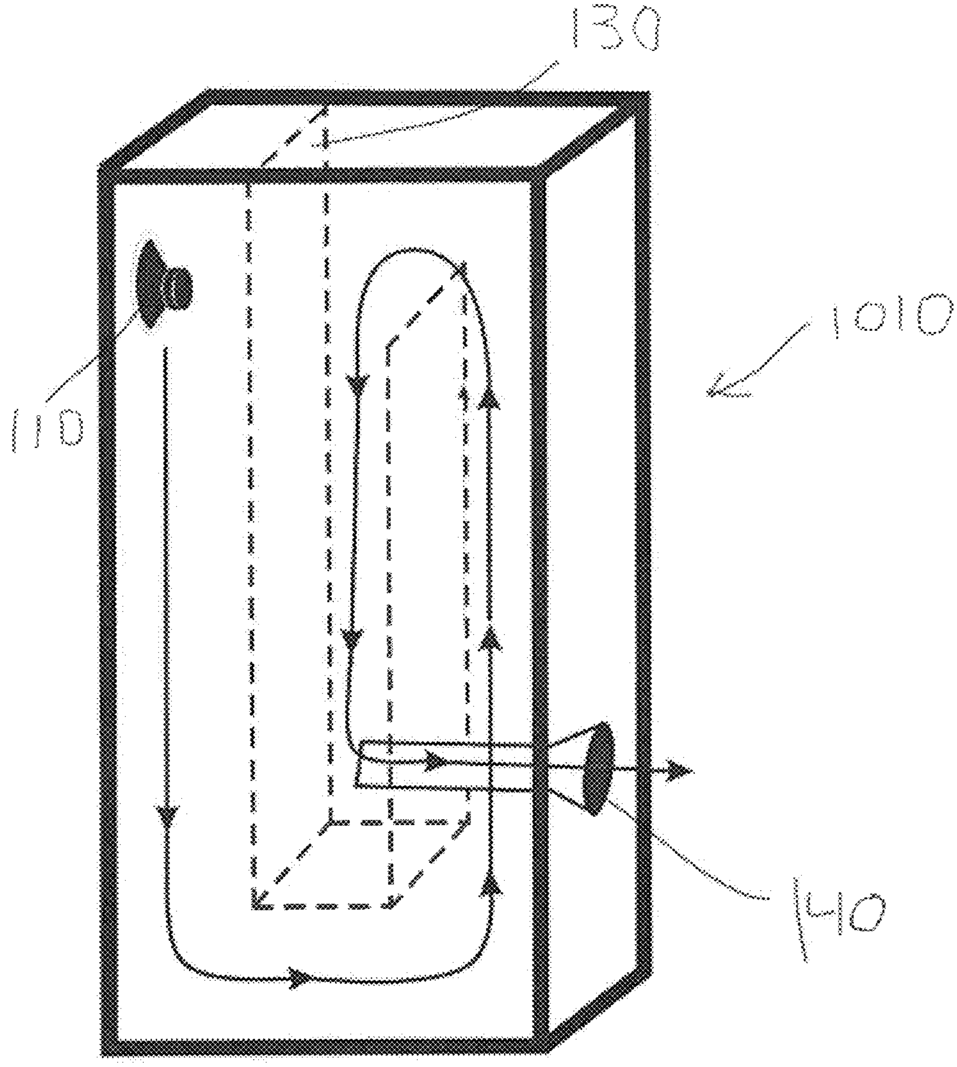
FIG. 2 shows another embodiment of a loudspeaker with a tuned port.
Figure 3:
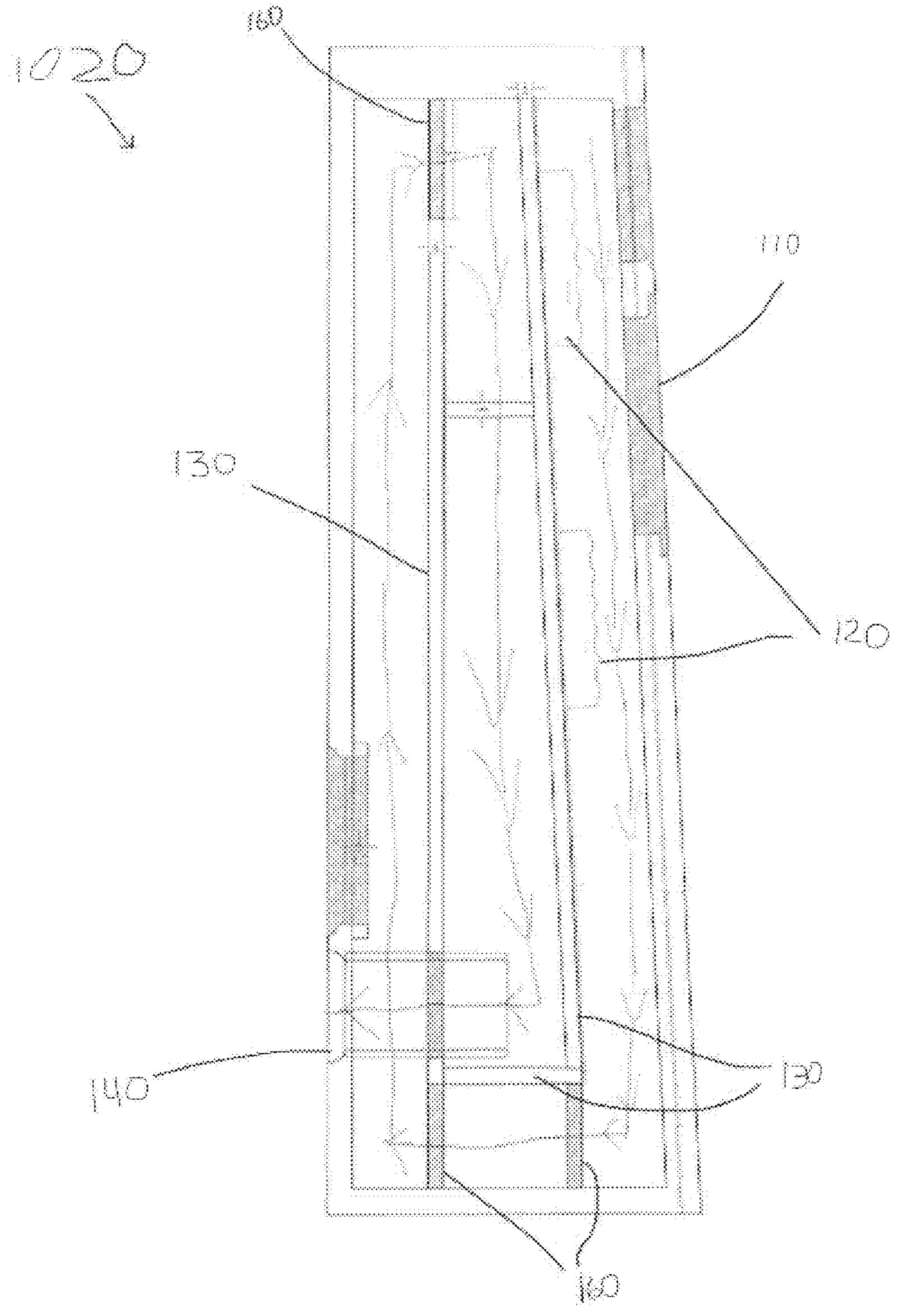
FIG. 3 shows a third embodiment of a loudspeaker with a tuned port.
Figure 4:
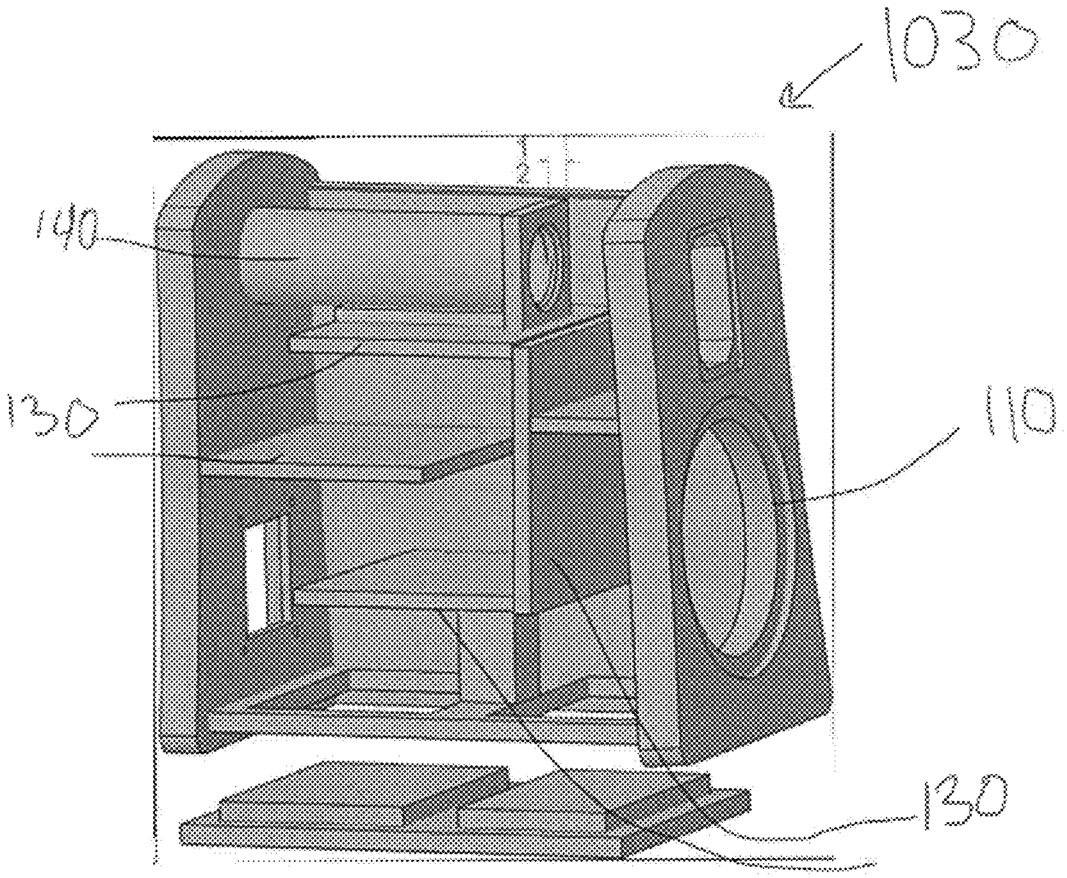
FIG. 4 shows a fourth embodiment of a loudspeaker with a tuned port.

In other embodiments, as shown in FIGS. 2-4, the loudspeaker may have a transmission line that may be folded, round or any other shape all terminating in a port. Loudspeakers 1010, 1020 and 1030, respectively each have a transmission line 130 connected to the tuned port 140. The port is the last segment of the fold of the transmission line (also called a "tuned pipe"). Keeping the ratio of the length to the cross-sectional area of the port correct for the proper tuning as a tuned port, the exact diameter of that port is altered in order to limit the effect and have it tuned with the rest of tuning. Here, the cross-sectional area of the port determines the Q. The Q determines how strong the effect is, so the size of the port has value in making the response smooth.

Loudspeaker 1010 shows the direction of air or sound travel from the speaker 110 down, under, then up and over the transmission line 130 finally exiting the port 140. Similarly, loudspeaker 1020 has air or sound travel from adjacent the speaker 110 down past dampening items 120 on the transmission line 130, through single reinforcement parts out 160 and then out through the port 140. Dampening items may be used as its purpose is to tune out internal resonances and prevent higher frequencies from resonating in the loudspeakers. It should be noted that dampening items may not be used in certain embodiments.

Loudspeaker 1030 has the speaker 110, being a woofer, where air or sound travels down from behind the speaker 110 through the various transmission lines 130. First the air/sound travels around the lowest most transmission line 130, to the middle transmission line 130 then the topmost transmission line 130, finally the air/sound goes around the exterior sides of the port 140 since there is space around the exterior wall of the port and the nearest transmission line 130 and the sides of the loudspeaker cabinet. The air/sound then goes to the opening of the port, which faces the front wall of the loudspeaker having the speaker 110, finally it exits out through the port 140. As shown in all figures, the speaker 110 is disposed on the front wall of the loudspeaker cabinet and the port 140 is disposed on a wall opposite the front wall, or a rear wall of the loudspeakers 1000, 1010, 1020 and 1030. The air/sound travels through and behind the speaker 110 at the front wall, then through the transmission line 130 and finally exits out the end of the port 140 on the rear wall of the cabinet.

Figure 5A:
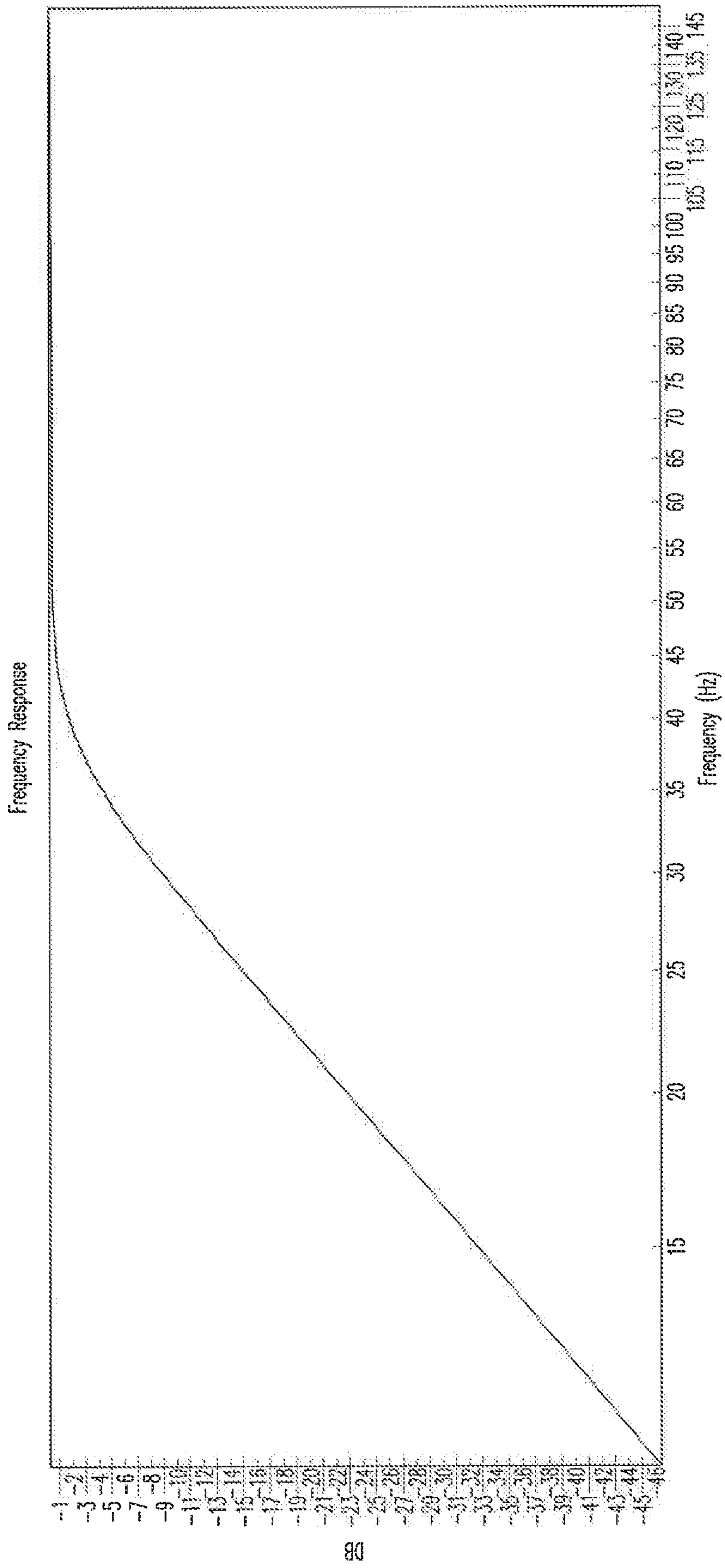
FIG. 5A shows the frequency response curve for a loudspeaker with a ported design.
Figure 5B:
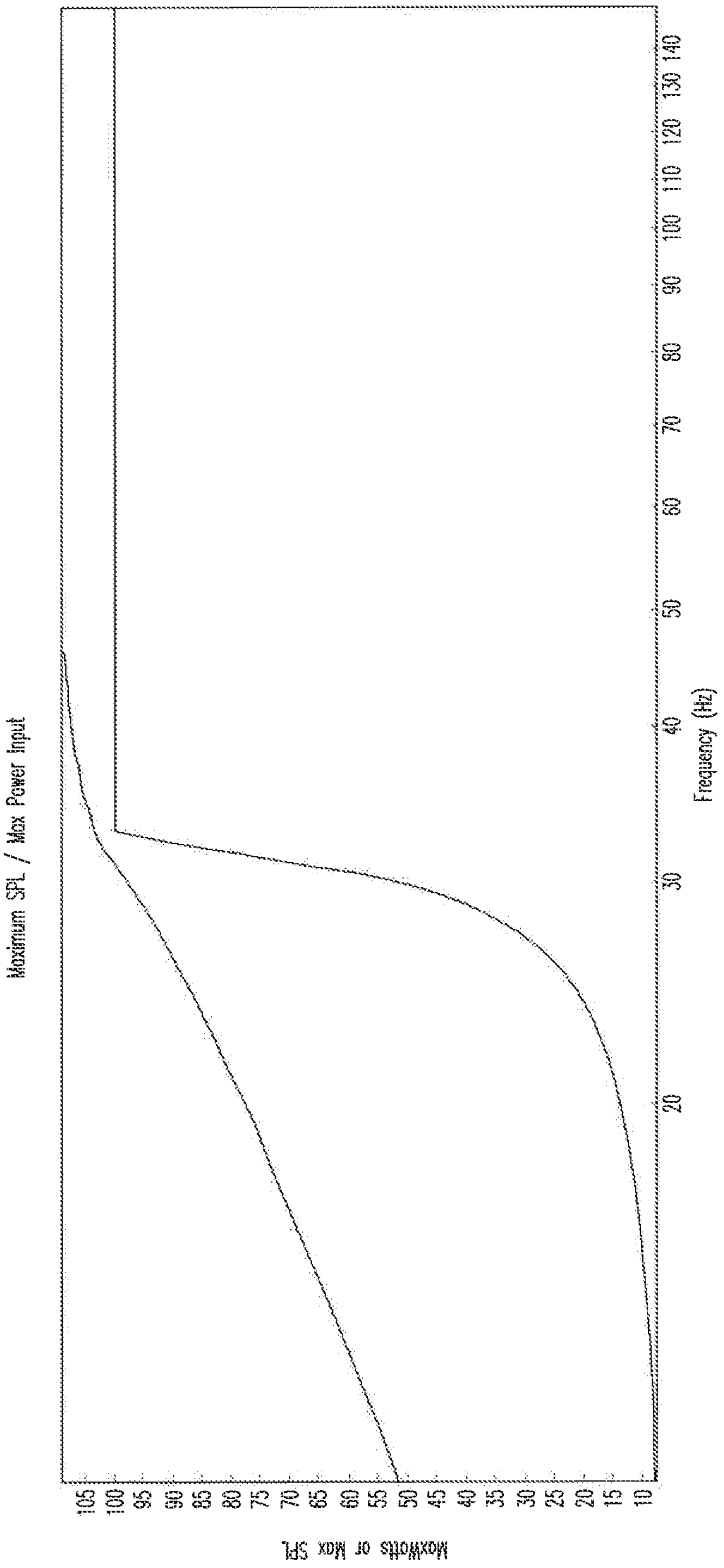
FIG. 5B shows the maximum SPL/Max Power Input for the ported loudspeaker as represented in FIG. 5A.

FIGS. 5A and 5B show one example of a frequency response curve for the ported loudspeakers, a portion of the present invention. FIG. 5A shows the frequency response curve of a ported loudspeaker which exhibits a flat frequency response (insignificant decibel (dB) loss) between 145 Hz to 40 Hz, at which point the level (dB) begins to decrease at a rate of 12 dB per octave. FIG. 5B shows the maximum SPL/Max Power Input, which shows the power handling of the speaker at a frequency range between <20 Hz and 145 Hz. Further details for said loudspeaker include:

| | | | |
|---|---|---|---|
| Res Freq = 37.7 | Qms = 1.85 | Power = 100 | Vent Freq = 38 |
| Res Freq in box = 37.7 | Vas = 1.618 | Xmax = 0.25 | Ql = 9 |
| Qes = 0.48 | Re = 3.3 | Piston Dia = 6.5 | Box Volume = 1.52 |

Try to Keep the Mach Number Below 0.1 in your vents

| Diameter | Length | Mach | Dual | Mach | Volume Calculations: |
|---|---|---|---|---|---|
| 1.0 | 0.23 | 0.565 | 0.89 | 0.282 | The Egyptian Golden ratio of box sides is 2.6/1.6/1 |
| 1.5 | 1.07 | 0.251 | 2.79 | 0.126 | Depth = 8.58 inches |
| 2.0 | 2.39 | 0.141 | 5.64 | 0.071 | Width = 13.73 inches |
| 2.5 | 4.20 | 0.090 | 9.47 | 0.045 | Height = 22.31 inches |
| 3.0 | 6.48 | 0.063 | 14.25 | 0.031 | Box bracing and Speakers could reduce Volume by 10% adjusted Sides: |
| 3.5 | 9.25 | 0.046 | 20.00 | 0.023 | Adjusted Depth = 8.86 inches |
| 4.0 | 12.50 | 0.035 | 26.72 | 0.018 | Adjusted Width = 14.17 inches |
| 4.5 | 16.23 | 0.028 | 34.40 | 0.014 | Adjusted Height = 23.03 inches |
| 5.0 | 20.45 | 0.023 | 43.04 | 0.011 | |

The tuning of the tuned port 140 part of the invention is based on the equations in the original Small Theile analysis on ported speaker design that dictate the volume of air in the box (Vb) (in cubic feet) relative to the Volume equivalent of the driver used (Vas) for the driver's tuning parameters for the type of tuning of the box/loudspeaker, such as a Butterworth maximally flat tuning, which is the tuning used in the art. This also dictates the ratio of the length of the port (Lv) to the area of the port (Sv) to achieve the desired tuning (Lv/Sv).

The tuning frequency of the transmission line 130 dictates the length of the transmission line, which is ¼ the wavelength of the desired tuning frequency. When maximizing the power handling the length of the transmission line is tuned to the frequency of maximum excursion (Fxmax) as derived by the Small Theile equations for tuned port speakers. When tuned for maximum bass extension, the length of the transmission line is tuned to the wavelength of the loudspeaker's in box resonance (Fb) as derived by the Small Theile equations for the tuning used The relative cross-sectional area of the port used also controls the Q(ratio of reactance to resistance) of the transmission line. The larger the area, the higher the Q, and the greater the effect of the transmission line's extension of the bass. Too large and there will be peaks in the response, too small and the extension is not achieved. The proper port for such a system has a diameter and length that works correctly in both systems.

Figure 6A:
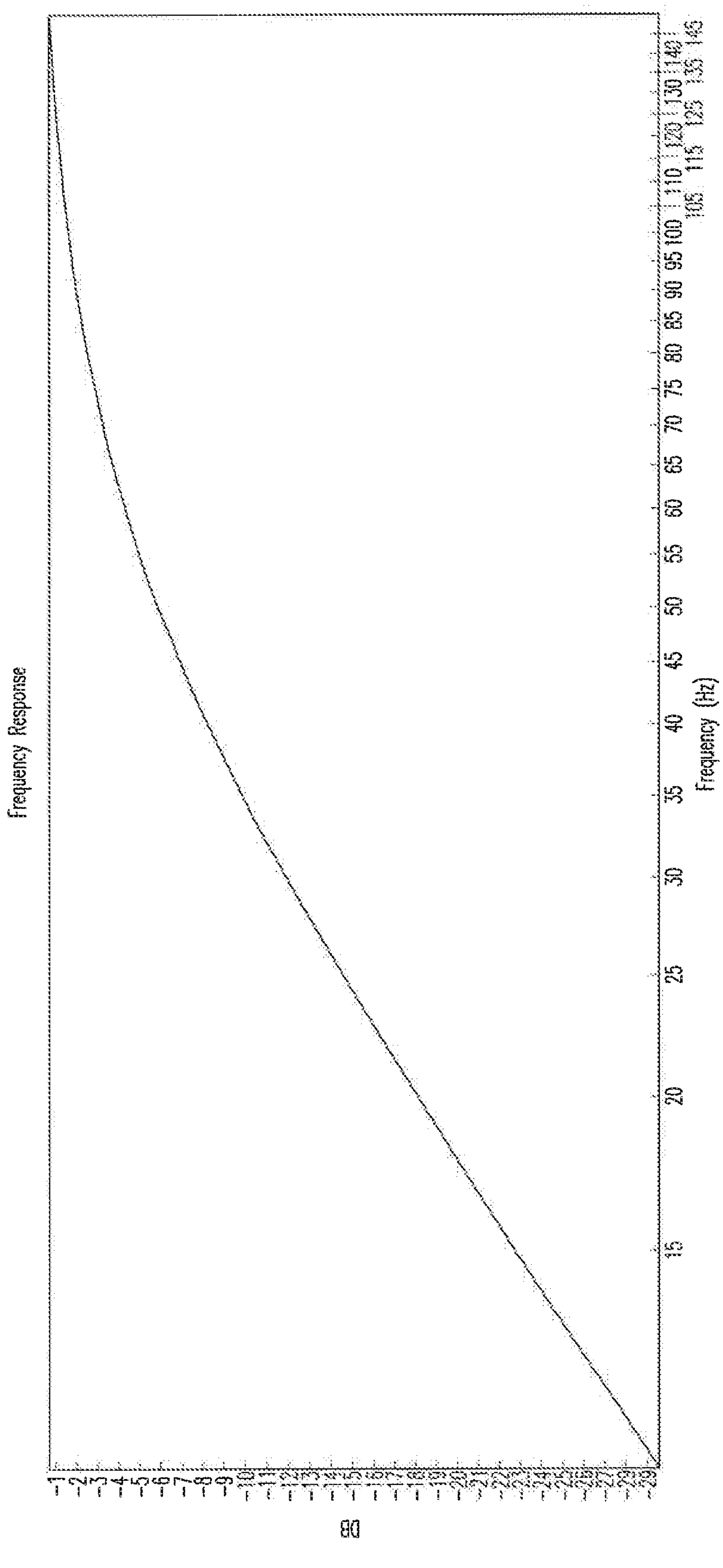
FIG. 6A shows the frequency response curve for a loudspeaker without a port.
Figure 6B:
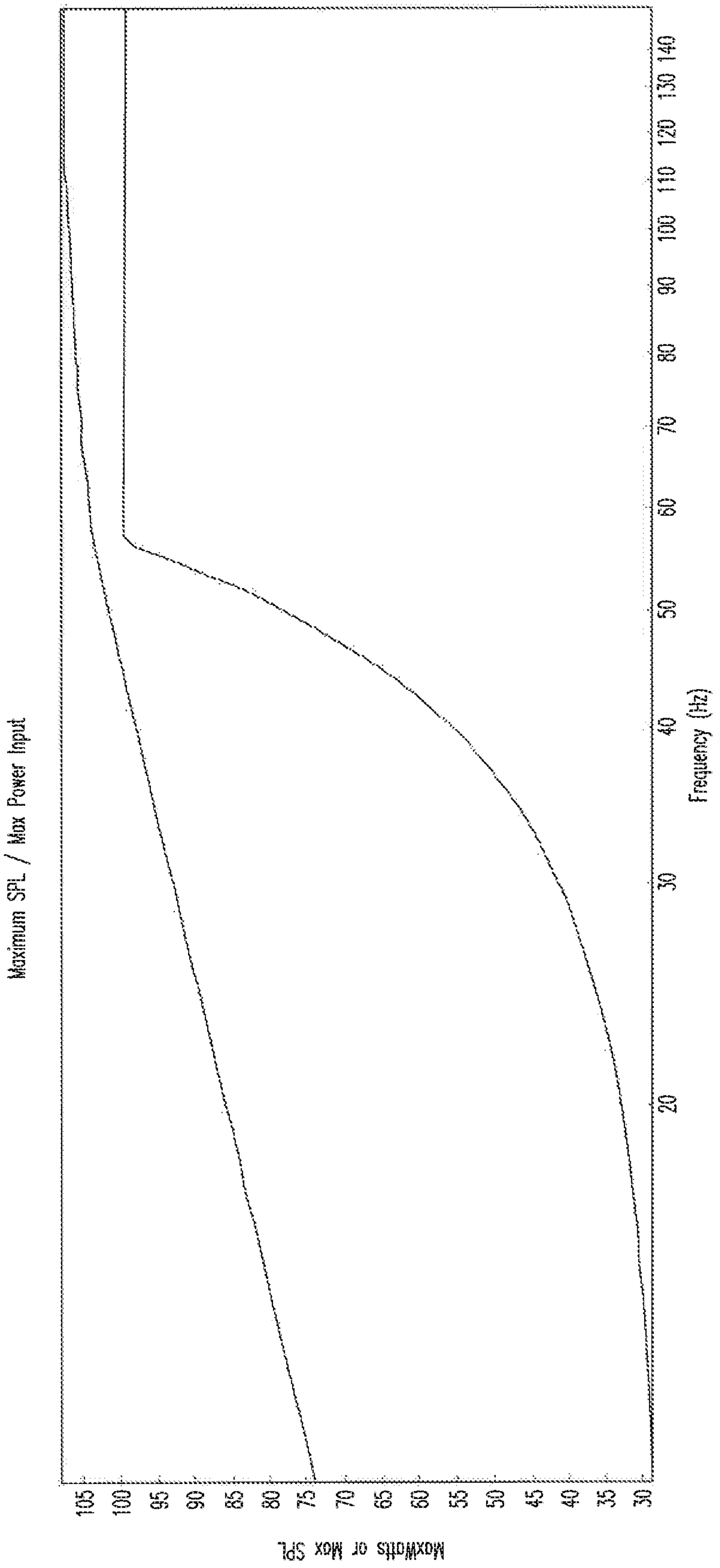
FIG. 6B shows the maximum SPL/Max Power Input for loudspeaker without a port as represented in FIG. 6A.

In contrast, the workings of a prior art loudspeaker without a port is different. FIG. 6A shows a frequency response curve of a closed box loudspeaker. In FIG. 6A, as contrasted to FIG. 5A, the sound level at 40 Hz (−8 dB) is already much lower than the sound level at 40 Hz in the ported loudspeaker shown in FIG. 5A (−1 dB). FIG. 6B exhibits the inefficiency of the closed box loudspeaker, where the power begins to drastically drop at ~58 Hz. In comparison to FIG. 6B, FIG. 5B shows the ported loudspeaker is acting more efficiently, not drastically losing power as low as 33 Hz, thus and pushing nearly the same amount of air at half the frequency of the closed box (105SPL at 58 Hz compared to 105SPL at 33 Hz). Further details for said closed box loudspeaker include:

| | | | |
|---|---|---|---|
| Res Freq = 37.7 | Qms = 1.85 | Power = 100 | Vent Freq = 26.43 |
| Res Freq in box = 37.7 | Vas = 1.618 | Xmax = 0.25 | Ql = 9 |
| Qes = 0.48 | Re = 3.3 | Piston Dia =6.5 | Box Volume = 1.52 |

-continued

| | |
|---|---|
| Ports not used in a scaled box. | Volume Calculations:<br>The Egyptian Golden ratio of box sides is 2.6/1.6/1<br>Depth = 8.58 inches<br>Width = 13.73 inches<br>Height = 22.31 inches<br>Box bracing and Speakers could reduce Volume by 10% adjusted Sides:<br>Adjusted Depth = 8.86 inches<br>Adjusted Width = 14.17 inches<br>Adjusted Height = 23.03 inches |

In prior art loudspeakers, the normal excursion limited power handling curve has a dip slightly above system resonance. In the present invention, when the internal transmission line is tuned to the frequency of the system resonance, the excursion of the woofer is greatly decreased by the synchronized resonance of the line. At the same time, power handling is greatly increased. The presence of the transmission line in the present invention also extends response well below system resonance by coupling the length of air in the transmission line and extending the impedance matched bandwidth.

Figure 7:
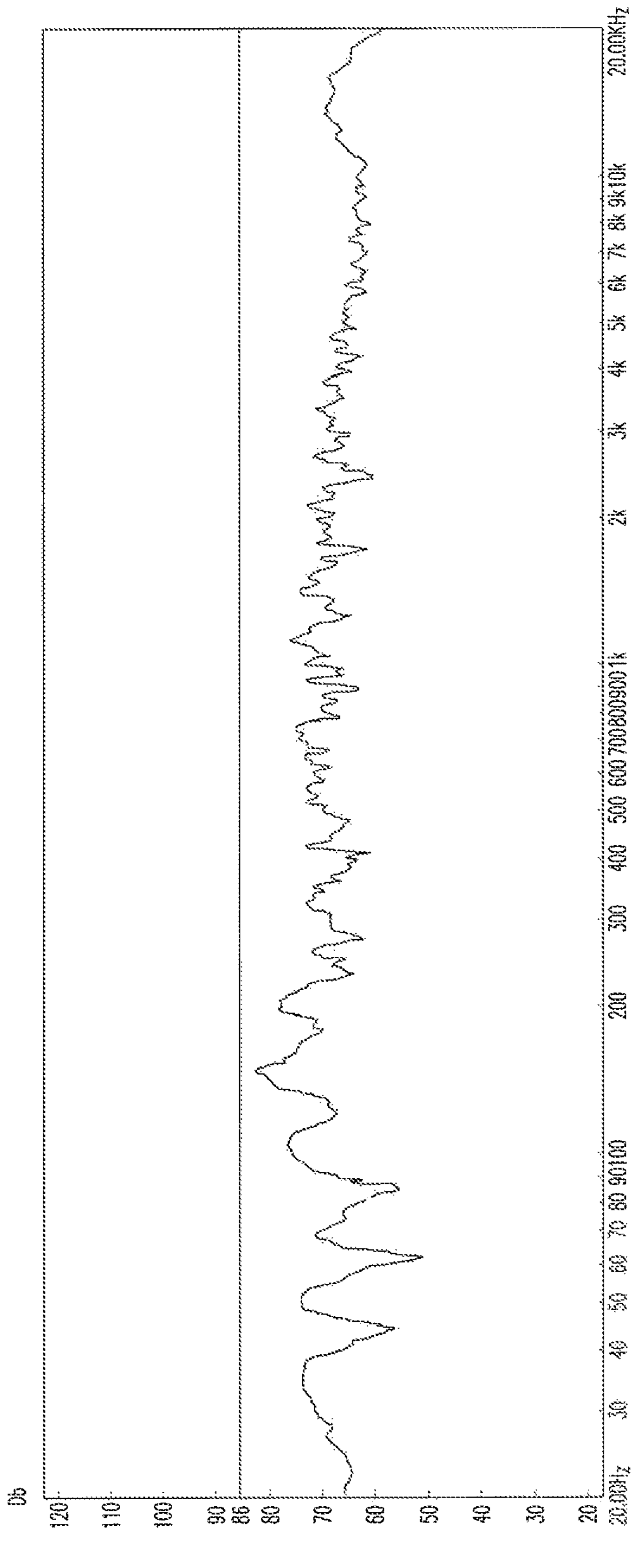
FIG. 7 shows an example of the frequency response curve of an embodiment of the present invention.

FIG. 7 shows the frequency response of a system utilizing the current invention, the transmission line combined with a tuned port, exhibiting a frequency response curve that is optimized at frequencies (~20 Hz) lower than the lowest optimized frequency of FIG. 5A (~40 Hz).

The tuned port system is the volume of the box, or loudspeaker, in ratio to the length of the port, in ratio to the cross-sectional area of the port. The cross-sectional area ratio to the length of the port is in a particular volume box. The tuning changes according to the parameters of the driver used as per the Small Theile analysis.

By combining the two, the advantages of each transmission lines 130 and tuned ports 140 are increased more so than when used independently. Also, using both the transmission line 130 with the tuned port 140 together increases system power handling. As seen in the figures, in the present invention both the transmission line 130 and the port 140 are working in the volume behind the speaker 110 while the front outputs to the air.

In one embodiment, to improve frequency responses at lower frequencies the transmission line 130 may be tuned at the maximum excursion point, where the length of the transmission line is calculated as one quarter of the wavelength of the frequency of the system maximum excursion. Wavelength is calculated as λ(wavelength)=v(velocity)/f (frequency), and velocity is substituted as the speed of sound. If the transmission line is put in at the frequency of maximum excursion it will decrease the excursion of the cone significantly at that frequency because of its resonance and it will extend the base response lower than it had been before.

In other embodiments frequency responses may be improved at lower frequencies using other ways of tuning the transmission line. For instance, a user may tune the transmission line 130 to the resonance frequency of a system with a tuned port. For instance, by using the resonance frequency at the −3 db point of the loudspeaker system, one can tune the transmission line using that resonance frequency in the formula of: is one quarter of a wavelength of the resonant frequency, using the formula above to calculate the wavelength.

Example

In a system box having 1 cubic foot of volume and a system resonance of 40 Hz, a 3" diameter by 12" long port would be appropriate for a system −3 db point of 42 HZ.

Where a transmission line is incorporated in the system box, the maximum excursion point at approximately 1.3 times resonance, say 55 Hz would make the transmission line 1125 ft/second/four/55=5.113 feet, or 61.36 inchers. The cross-sectional area of the port should be approximately ⅓ the area of the cone. Increasing the relative cross-sectional area of the port increases the Q and thus the effect. Decreasing the relative cross-sectional area decreases the Q and thus the effect. The cross-sectional area of the transmission line must be at least the area of the cone. If the frequency (length of transmission line, ¼ wavelength of the frequency desired) is put at the resonance point as dictated by the Small-Theile analysis then a maximum extension of the deep bass is attained. The excursion of the cone stays as it would have been otherwise.

While specific embodiments of the invention have been described and illustrated, such embodiments should be considered illustrative of the invention only and not as limiting the invention as construed in accordance with the accompanying claims. One of ordinary skill in the art could alter the above embodiments or provide insubstantial changes that may be made without departing from the scope of the invention.

The invention claimed is:

1. A method of improving frequency responses at lower frequencies from a loudspeaker having a loudspeaker cabinet, a speaker disposed on a front wall of the loudspeaker cabinet and a tuned port, the method comprising simultaneously tuning a transmission line, the transmission line is defined by at least one wall of the loudspeaker cabinet, the transmission line is formed in a cavity of the loudspeaker cabinet and directly behind the speaker, wherein the transmission line is tuned to a frequency of the tuned port, the tuned port is disposed on a wall of the loudspeaker cabinet that is opposite the speaker.

2. The method of claim 1, wherein the transmission line is tuned to a maximum excursion point of the loudspeakers.

3. The method of claim 1, wherein the transmission line is tuned to a resonance frequency of the tuned port.

4. A loudspeaker having improved frequency responses at lower frequencies comprising a loudspeaker cabinet, a speaker disposed on a front wall of the loudspeaker cabinet, a tuned port, the tuned port is disposed on a wall of the loudspeaker cabinet that is opposite the speaker, said tuned port tuned to a frequency, and a transmission line, said transmission line tuned to a frequency, the transmission line is defined by at least one cabinet wall of the loudspeaker cabinet, the transmission line is formed in a cavity of the loudspeaker cabinet and directly behind the speaker, wherein the transmission line and the tuned port are simultaneously tuned and wherein the frequency of the transmission line is tuned to the frequency of the tuned port.

5. The loudspeaker of claim 4, wherein the transmission line is tuned to a maximum excursion point of the loudspeakers.

6. The loudspeaker of claim 4, wherein the transmission line is tuned to a resonance frequency of the loudspeakers with a tuned port.

7. A loudspeaker comprising a loudspeaker cabinet, a speaker disposed on a front wall of the loudspeaker cabinet, a transmission line, the transmission line is defined by at least one wall of a cabinet of the loudspeaker, the transmission line is formed in a cavity of the loudspeaker cabinet and directly behind the speaker, and a port, the port is disposed on a wall of the loudspeaker cabinet that is opposite the speaker.

8. The loudspeaker of claim 1, wherein the port is tuned.

9. The loudspeaker of claim 1, wherein the transmission line is one quarter of a wavelength of system maximum excursion.

10. The loudspeaker of claim 1, wherein the cross-sectional area of the port is approximately ⅓ the area of a cone.

11. The loudspeaker of claim 1, wherein the cross-sectional area of the transmission line is at least the area of a cone.

12. The loudspeaker of claim 1, wherein said transmission line terminates in the tuned port.

13. The loudspeaker of claim 4, wherein said transmission line terminates in the tuned port.

14. The loudspeaker of claim 7, wherein said transmission line terminates in the tuned port.

15. The loudspeaker of claim 4, wherein said speaker disposed on the front wall is exposed externally of the loudspeaker cabinet.

16. The loudspeaker of claim 4, wherein both the transmission line and the port work in a volume behind the loudspeaker cabinet.

* * * * *